United States Patent
Lee

(10) Patent No.: US 8,656,123 B2
(45) Date of Patent: Feb. 18, 2014

(54) SNAPSHOT PRESERVED DATA CLONING

(75) Inventor: Kent Lee, Ladera Ranch, CA (US)

(73) Assignee: Dot Hill Systems Corporation, Longmont, CO (US)

( * ) Notice: Subject to any disclaimer, the term of this patent is extended or adjusted under 35 U.S.C. 154(b) by 595 days.

(21) Appl. No.: 12/540,243

(22) Filed: Aug. 12, 2009

(65) Prior Publication Data

US 2009/0307450 A1    Dec. 10, 2009

Related U.S. Application Data

(62) Division of application No. 11/734,081, filed on Apr. 11, 2007, now Pat. No. 7,716,183.

(51) Int. Cl.
*G06F 12/16* (2006.01)
*G06F 11/14* (2006.01)
*G06F 11/20* (2006.01)

(52) U.S. Cl.
CPC ........ *G06F 11/1446* (2013.01); *G06F 11/2089* (2013.01); *G06F 2201/84* (2013.01)
USPC .................................. 711/162; 711/E12.103

(58) Field of Classification Search
CPC .......................... G06F 11/1446; G06F 2201/84
See application file for complete search history.

(56) References Cited

U.S. PATENT DOCUMENTS

| | | | |
|---|---|---|---|
| 5,551,046 A | 8/1996 | Mohan et al. | |
| 5,778,189 A | 7/1998 | Kimura et al. | |
| 5,812,843 A | 9/1998 | Yamazaki et al. | |
| 5,963,962 A | 10/1999 | Hitz et al. | |
| 6,073,209 A | 6/2000 | Bergsten et al. | |
| 6,076,148 A * | 6/2000 | Kedem | 711/162 |
| 6,289,356 B1 | 9/2001 | Hitz et al. | |
| 6,292,808 B1 | 9/2001 | Obermarck et al. | |
| 6,341,341 B1 | 1/2002 | Grummon et al. | |
| 6,548,634 B1 | 4/2003 | Ballinger et al. | |
| 6,557,079 B1 | 4/2003 | Mason, Jr. et al. | |
| 6,594,744 B1 | 7/2003 | Humlicek et al. | |

(Continued)

FOREIGN PATENT DOCUMENTS

| | | |
|---|---|---|
| CA | 2165912 | 6/1997 |
| EP | 1003103 | 5/2005 |

(Continued)

OTHER PUBLICATIONS

International Preliminary Report on Patentability and Written Opinion from the PCT dated Oct. 22, 2009 with regard to corresponding PCT Application No. PCT/US/08/57326, 10 pages.

(Continued)

*Primary Examiner* — Reginald Bragdon
*Assistant Examiner* — Eric Loonan
(74) *Attorney, Agent, or Firm* — Thomas J. Lavan

(57) ABSTRACT

A method and device for cloning snapshots is provided. A new snapshot can be created by cloning an existing snapshot. The clone snapshot may use the preserved data of the existing snapshot, thereby obviating the need to copy the preserved data. Additionally, the clone snapshot may be created with a data structure for storing write data. Since the clone snapshot initially has no write data to store, the creation of the entire clone snapshot can be accomplished without copying any preserved data or write data from the existing snapshot, thereby increasing the efficiency with which a clone snapshot can be created.

14 Claims, 9 Drawing Sheets

(56) References Cited

U.S. PATENT DOCUMENTS

| | | |
|---|---|---|
| 6,615,223 B1 | 9/2003 | Shih et al. |
| 6,711,409 B1 | 3/2004 | Zavgren et al. |
| 6,771,843 B1 | 8/2004 | Huber et al. |
| 6,792,518 B2 * | 9/2004 | Armangau et al. ........... 711/162 |
| 6,907,512 B2 | 6/2005 | Hill et al. |
| 6,957,362 B2 | 10/2005 | Armangau et al. |
| 7,047,380 B2 | 5/2006 | Tormasov et al. |
| 7,050,457 B2 | 5/2006 | Erfurt et al. |
| 7,100,089 B1 | 8/2006 | Phelps et al. |
| 7,165,156 B1 | 1/2007 | Cameron et al. |
| 7,191,304 B1 | 3/2007 | Cameron et al. |
| 7,194,550 B1 | 3/2007 | Chamdani et al. |
| 7,206,961 B1 | 4/2007 | Mutalik et al. |
| 7,243,157 B2 | 7/2007 | Levin et al. |
| 7,272,686 B2 | 9/2007 | Yagisawa et al. |
| 7,313,581 B1 | 12/2007 | Bachmann et al. |
| 7,363,444 B2 | 4/2008 | Ji et al. |
| 7,373,366 B1 | 5/2008 | Chatterjee et al. |
| 7,426,618 B2 | 9/2008 | Vu et al. |
| 7,526,640 B2 | 4/2009 | Bazan Bejarano et al. |
| 7,593,973 B2 | 9/2009 | Lee et al. |
| 2001/0039629 A1 | 11/2001 | Feague et al. |
| 2002/0083037 A1 | 6/2002 | Lewis et al. |
| 2002/0091670 A1 | 7/2002 | Hitz et al. |
| 2002/0099907 A1 | 7/2002 | Castelli et al. |
| 2002/0112084 A1 | 8/2002 | Deen et al. |
| 2003/0154314 A1 | 8/2003 | Mason, Jr. et al. |
| 2003/0158863 A1 | 8/2003 | Haskin et al. |
| 2003/0167380 A1 | 9/2003 | Green et al. |
| 2003/0188223 A1 | 10/2003 | Alexis et al. |
| 2003/0191745 A1 | 10/2003 | Jiang et al. |
| 2003/0229764 A1 | 12/2003 | Ohno et al. |
| 2004/0030727 A1 | 2/2004 | Armangau et al. |
| 2004/0030846 A1 | 2/2004 | Armangau et al. |
| 2004/0034647 A1 | 2/2004 | Paxton et al. |
| 2004/0054131 A1 | 3/2004 | Ballinger et al. |
| 2004/0093555 A1 | 5/2004 | Therrien et al. |
| 2004/0117567 A1 | 6/2004 | Lee et al. |
| 2004/0133718 A1 | 7/2004 | Kodama et al. |
| 2004/0172509 A1 | 9/2004 | Takeda et al. |
| 2004/0204071 A1 | 10/2004 | Bahl et al. |
| 2004/0260673 A1 | 12/2004 | Hitz et al. |
| 2004/0267836 A1 | 12/2004 | Armangau et al. |
| 2005/0004979 A1 | 1/2005 | Berkowitz et al. |
| 2005/0044088 A1 | 2/2005 | Lindsay et al. |
| 2005/0065985 A1 | 3/2005 | Tummala et al. |
| 2005/0066095 A1 * | 3/2005 | Mullick et al. ................ 710/200 |
| 2005/0071393 A1 | 3/2005 | Ohno et al. |
| 2005/0122791 A1 | 6/2005 | Hajeck et al. |
| 2005/0166022 A1 | 7/2005 | Watanabe et al. |
| 2005/0182910 A1 | 8/2005 | Stager et al. |
| 2005/0193180 A1 | 9/2005 | Fujibayashi et al. |
| 2005/0198452 A1 | 9/2005 | Watanabe et al. |
| 2005/0240635 A1 | 10/2005 | Kapoor et al. |
| 2005/0246397 A1 | 11/2005 | Edwards et al. |
| 2005/0246503 A1 | 11/2005 | Fair et al. |
| 2006/0020762 A1 | 1/2006 | Urmston |
| 2006/0053139 A1 | 3/2006 | Marzinski et al. |
| 2006/0064541 A1 | 3/2006 | Kano et al. |
| 2006/0107006 A1 | 5/2006 | Green et al. |
| 2006/0155946 A1 | 7/2006 | Ji et al. |
| 2006/0212481 A1 * | 9/2006 | Stacey et al. ................ 707/104.1 |
| 2006/0271604 A1 | 11/2006 | Shoens et al. |
| 2007/0011137 A1 | 1/2007 | Kodama |
| 2007/0038703 A1 | 2/2007 | Tendjoukian et al. |
| 2007/0055710 A1 | 3/2007 | Malkin et al. |
| 2007/0094466 A1 | 4/2007 | Sharma et al. |
| 2007/0100808 A1 | 5/2007 | Balogh et al. |
| 2007/0143563 A1 | 6/2007 | Pudipeddi et al. |
| 2007/0185973 A1 | 8/2007 | Wayda et al. |
| 2007/0186001 A1 | 8/2007 | Wayda et al. |
| 2007/0198605 A1 | 8/2007 | Saika |
| 2007/0266066 A1 | 11/2007 | Kapoor et al. |
| 2007/0276885 A1 | 11/2007 | Valiyaparambil et al. |
| 2008/0072003 A1 | 3/2008 | Vu et al. |
| 2008/0082593 A1 | 4/2008 | Komarov et al. |
| 2008/0114951 A1 | 5/2008 | Lee et al. |
| 2008/0177954 A1 | 7/2008 | Lee et al. |
| 2008/0177957 A1 | 7/2008 | Lee et al. |
| 2008/0256141 A1 | 10/2008 | Wayda et al. |
| 2008/0256311 A1 | 10/2008 | Lee et al. |
| 2008/0281875 A1 | 11/2008 | Wayda et al. |
| 2008/0281877 A1 | 11/2008 | Wayda et al. |
| 2008/0320258 A1 | 12/2008 | Wayda et al. |

FOREIGN PATENT DOCUMENTS

| | | |
|---|---|---|
| WO | WO 94/29807 | 12/1994 |
| WO | WO 02050716 | 6/2002 |
| WO | WO 2005/111773 | 11/2005 |
| WO | WO 2005/111802 | 11/2005 |

OTHER PUBLICATIONS

Office Action in U.S. Appl. No. 11/561,512, Dec. 10, 2009.
Official Action for U.S. Appl. No. 11/747,109, mailed Dec. 14, 2009.
Official Action for U.S. Appl. No. 11/747,127, mailed Jan. 6, 2010.
Official Action for U.S. Appl. No. 11/624,565, mailed Nov. 30, 2009.
Office Action in U.S. Appl. 11/561,512, Mar. 18, 2010.
Official Action for U.S. Appl. No. 11/945,940, mailed Mar. 5, 2010.
Official Action for U.S. Appl. No. 11/747,109, mailed Mar. 30, 2010.
Official Action for U.S. Appl. No. 11/624,524, mailed Jan 26, 2010.
Notice of Allowance for U.S. Appl. No. 11/734,081, mailed Feb. 2, 2010.
Notice of Allowance for U.S. Appl. No. 11/734,081, mailed Mar. 10, 2010.
Office Action in U.S. Appl. No. 11/779,965, Jan. 29, 2010.
Written Opinion from the PCT dated Mar. 27, 2007 with regard to corresponding PCT Application No. PCT/US/06/32506, 10 pages.
International Search Report from the PCT dated Mar. 27, 2007 with regard to corresponding PCT Application No. PCT/US/06/32506, 3 pages.
International Preliminary Report on Patentability and Written Opinion from the PCT dated Mar. 20, 2008 with regard to corresponding PCT Application No. PCT/US/06/032506, 10 pages.
International Search Report from the PCT dated Aug. 7, 2008 with regard to corresponding PCT Application No. PCT/US/08/57326, 2 pages.
Written Opinion from the PCT dated Aug. 7, 2008 with regard to corresponding PCT Application No. PCT/US/08/57326, 6 pages.
Office Action in U.S. Appl. No. 11/277,738, Apr. 3 2007, 14 pages.
Office Action in U.S. Appl. No. 11/277,738, Jul. 31, 2007, 8 pages.
Office Action in U.S. Appl. No. 11/277,738, Dec. 6, 2007, 9 pages.
Notice of Allowance in U.S. Appl. No. 11/277,738, Mar. 20, 2008, 6 pages.
Official Action for U.S. Appl. 11/561,512, mailed Jun. 25, 2009.
Office Action (Restriction) in U.S. Appl. No. 11/561,512, Apr. 3, 2009, 11 pages.
Notice of Allowance for U.S. Appl. No. 11/560,174, mailed Feb. 9, 2009.
Official Action for U.S. Appl. No. 11/560,174, mailed Sep. 5, 2008.
Official Action for U.S. Appl. No. 11/624,524, mailed Dec. 11, 2008.
Official Action for U.S. Appl. No. 11/624,524, mailed Jun. 16, 2009.
Official Action for U.S. Appl. No. 11/624,565, mailed Mar. 30, 2009.
Official Action for U.S. Appl. No. 11/747,109, mailed Mar. 9, 2009.
Official Action for U.S. Appl. No. 11/734,081, mailed May 8, 2009.
Examiner's answer in U.S. Appl. 11/561,512, Sep. 2, 2010.
Notice of Allowance for U.S. Appl. No. 11/945,940, mailed Jul. 13, 2010.
Notice of Allowance for U.S. Appl. No. 11/747,127, mailed Jul. 13, 2010.
Notice of Allowance for U.S. Appl. No. 11/624,565, mailed Sep. 14, 2010.
Examiner's answer for U.S. Appl. No. 11/624,524, mailed Sep. 10, 2010.
Official Action for U.S. Appl. No. 12/780,891, mailed Sep. 20, 2010.
Office Action in U.S. Appl. No. 11/779,965, Jun. 24, 2010.
Office Action in U.S. Appl. No. 11/561,680, Nov. 5, 2010.

(56) References Cited

OTHER PUBLICATIONS

Notice of Allowance for U.S. Appl. No. 11/624,565, mailed Sep. 29, 2010.
Official Action for U.S. Appl. No. 11/768,127, mailed Nov. 3, 2010.
Office Action in U.S. Appl. No. 11/779,965, Dec. 16, 2010.
Office Action in U.S. Appl. No. 11/561,680, Apr. 15, 2011.
Notice of Allowance for U.S. Appl. No. 11/779,965, mailed May 16, 2011.
Notice of Allowance for U.S. Appl. No. 11/779,965, mailed May 27, 2011.
Official Action for U.S. Appl. No. 11/747,109, mailed Mar. 18, 2011.
Notice of Allowance for U.S. Appl. No. 11/747,109, mailed Apr. 29, 2011.
Official Action for U.S. Appl. No. 12/780,891, mailed Mar. 25, 2011.
Notice of Allowance for U.S. Appl. No. 11/747,127, mailed May 14, 2010.
Notice of Allowance for U.S. Appl. No. 11/747,127, mailed Jun. 2, 2010.
Notice of Allowance for U.S. Appl. No. 11/747,127, mailed Jun. 15, 2010.
Official Action for U.S. Appl. No. 11/768,127, mailed Apr. 2, 2010.
Official Action for U.S. Appl. No. 11/768,127, mailed Jun. 1, 2010.
Notice of Allowance for U.S. Appl. No. 11/945,940, mailed Jun. 18, 2010.
Analysis from foreign associate dated Oct. 22, 2009 from 1st office action from Chinese patent office for application 200680032724.8.
Office Action in U.S. Appl. No. 11/561,512, Oct. 30, 2009, 9 pages.
Official Action for U.S. Appl. No. 11/747,109, mailed Sep. 21, 2009.
Official Action for U.S. Appl. No. 11/747,127, mailed Oct. 6, 2009.
Official Action for U.S. Appl. No. 11/624,524, mailed Sep. 16, 2009.
Official Action for U.S. Appl. No. 11/734,081, mailed Aug. 21, 2009.
Official Action for U.S. Appl. No. 11/747,127, mailed Apr. 15, 2009.
Notice of Allowance for U.S. Appl. No. 11/747,109, mailed Jul. 11, 2011.
Official Action for U.S. Appl. No. 12/780,891, mailed Sep. 29, 2011.
Notice of allowance for U.S. Appl. No. 11/768,127, mailed Apr. 18, 2012.
Notice of Allowance for U.S. Appl. No. 12/780,891, mailed Apr. 26, 2012.
Official Action for U.S. Appl. No. 11/768,127, mailed Dec. 28, 2011.

\* cited by examiner

SNAPSHOT PRESERVED DATA CLONING

CROSS REFERENCE TO RELATED APPLICATION(S)

This application is a divisional of U.S. Pat. No. 7,716,183 (application Ser. No. 11/734,081 filed Apr. 11, 2007), issued May 11, 2010.

| Ser. No. | Filing Date | Title |
|---|---|---|
| 7,426,618 11.277,738 (4430-58) | Mar. 28, 2006 | SNAPSHOT RESTORE METHOD AND APPARATUS |
| 11/945,940 (4430-58-CIP) | Nov. 27, 2007 | METHOD AND APPARATUS FOR MASTER VOLUME ACCESS DURING VOLUME COPY |
| 11/561,512 (4430-61) | Nov. 20, 2006 | DATA REPLICATION METHOD AND APPARATUS |
| 11/561,680 (4430-62) | Nov. 20, 2006 | PULL DATA REPLICATION MODEL |
| 11/560,174 (4430-66) | Nov. 15, 2006 | METHOD AND APPARATUS FOR TRANSFERRING SNAPSHOT DATA |
| 11/624,524 (4430-67) | Jan. 18, 2007 | METHOD AND APPARATUS FOR QUICKLY ACCESSING BACKING STORE METADATA |
| 11/624,565 (4430-68) | Jan. 18, 2007 | DELETION OF ROLLBACK SNAPSHOT PARTITION |
| 11/747,109 (4430-69) | May 10, 2007 | AUTOMATIC TRIGGERING OF BACKING STORE RE-INITIALIZATION |
| 11/747,127 (4430-70) | May 10, 2007 | BACKING STORE REINITIALIZATION METHOD AND APPARATUS |
| 11/768,127 (4430-72) | Jun. 25, 2007 | SNAPSHOT RESET METHOD AND APPARATUS |
| 11/779,965 (4430-73) | Jul. 19, 2007 | METHOD AND APPARATUS FOR SEPARATING SNAPSHOT PRESERVED AND WRITE DATA |

FIELD

The present invention is directed to data storage management. In particular, the present invention is directed to methods and apparatuses for cloning snapshots.

BACKGROUND

The need to store digital files, documents, pictures, images and other data continues to increase rapidly. In connection with the electronic storage of data, various data storage systems have been devised for the rapid and secure storage of large amounts of data. Such systems may include one or a plurality of storage devices that are used in a coordinated fashion. Systems in which data can be distributed across multiple storage devices such that data will not be irretrievably lost if one of the storage devices (or in some cases, more than one storage device) fails are also available. Systems that coordinate operation of a number of individual storage devices can also provide improved data access and/or storage times. Examples of systems that can provide such advantages can be found in the various RAID (redundant array of independent disks) levels that have been developed. Whether implemented using one or a plurality of storage devices, the storage provided by a data storage system can be treated as one or more storage volumes.

In order to facilitate the availability of desired data, it is often advantageous to maintain different versions of a data storage volume. Indeed, data storage systems are available that can provide at least limited data archiving through backup facilities and/or snapshot facilities. The use of snapshot facilities greatly reduces the amount of storage space required for archiving large amounts of data.

Snapshots provide a versatile feature that is useful for data recovery operations, such as backup and recovery of storage elements. However, traditional snapshots are read-only accessible and their contents cannot be modified, thereby rendering their use somewhat limited, particularly for operating systems and applications that do not have a notion of a read-only data store (e.g., a read-only file system) and that expect to write metadata at any time that the file system is accessible. When a storage element that is held in a snapshot is exported to a client or host and contains the data for such a problematic file system, an issue arises in that the host may attempt to write data to the read-only image. This is a fundamental issue in the design of a reliable system for backups. In general, once a backup image is made via a mechanism like a snapshot, that image should be maintained as a point-in-time representation of the storage volume. A controller typically modifies snapshot data by what is known as a copy-on-write (COW) operation. The COW operation determines when a change to a storage volume is going to occur and then determines if the targeted blocks of that storage volume have changed since a snapshot was taken. If the blocks have not changed since the snapshot was taken, then the controller proceeds by copying the original contents of those blocks and writing them to the snapshot data prior to changing the storage volume. The COW operation ensures that the data from the storage volume at the point-in-time that a snapshot was taken either resides on the storage volume or on the snapshot. The controller therefore changes the snapshot only when doing so is required to preserve the data that was on the storage volume at the time the snapshot was taken, but that will be overwritten on the storage volume.

On the other hand, direct modification of a snapshot image (e.g., direct modification by a client or host rather than a controller performing a COW operation) could have serious consequences. Such consequences may include the fact that the data of the snapshot is no longer a point-in-time copy and a consistent image of the storage volume may no longer be available for subsequent recovery operations. Accordingly, most snapshot facilities do not allow a host to write data directly to a snapshot, because doing so will change the point-in-time representation of that snapshot. Thus, most snapshots are limited to read-only operations.

A relatively recent advance in backup facilities is the ability to "clone" an existing snapshot, and perform a backup of the clone instead of from the active file system. With this type of file system, the file server is allowed to remain on-line during the backup. A clone of a snapshot is generally intended to represent the same point-in-time as the snapshot from which the clone originated. Accordingly, clones have the same read-only restrictions imposed on them as their parent snapshots and those that do not have read-only restriction imposed thereon cannot guarantee that a snapshot or its clone actually represent the point-in-time that the snapshot was taken. Another drawback to current cloning systems is that the creation of a clone may take a significant amount of time to complete because most cloning systems create a complete block-by-block copy of the snapshot for the clone. This complicates the creation of a single clone and all but precludes the creation of multiple clones of the same storage volume. The result is that clones tend to be used, one at a time, for short term operations and then are deleted.

SUMMARY

The present invention is directed to solving these and other problems and disadvantages of the prior art. In accordance with embodiments of the present invention, a service for efficiently cloning a snapshot is provided. The method generally comprises identifying a first snapshot of a storage volume, where the first snapshot corresponds to a first point-in-time capture of data on the storage volume. The method also comprises altering the first snapshot after the first point-in-time and creating a second snapshot that is a clone of the first snapshot and corresponds to the first point-in-time capture of the data on the storage volume. In accordance with at least some embodiments of the present invention, the method may be characterized by the fact that the second snapshot comprises less data than the first snapshot. By creating a clone snapshot with less data than its base snapshot, the efficiency of creating clone snapshots is greatly increased.

In accordance with other embodiments of the present invention, a device for controlling a storage system is provided. The device generally comprises a cloning application, where the cloning application is adapted to create a first clone snapshot of a base snapshot. The base snapshot may comprise a first data structure for maintaining preserved data in association with the base snapshot and a second data structure for maintaining write data in association with the base snapshot. Additionally, the first clone snapshot may reference the first data structure for preserved data and comprise a third data structure for maintaining write data in association with the first clone snapshot. This allows the first clone snapshot to share the preserved data of its base snapshot such that both snapshots can initially correspond to the same point-in-time of a storage volume. This may allow users to create a control data set established by the base snapshot that can be individually altered at each clone snapshot. Such a feature may be useful in conducting multiple experiments and variations thereof on a base data set without fear of having one experiment affect another experiment.

In accordance with still other embodiments of the present invention, a clone of a snapshot corresponding to a point-in-time capture of data on a storage volume is provided. The base snapshot may comprise both preserved data and write data whereas the clone snapshot may comprise a first data structure that references the preserved data of the snapshot and a second data structure for maintaining write data in association with the clone.

Additional features and advantages of embodiments of the present invention will become more readily apparent from the following description, particularly when taken together with the accompanying drawings.

DETAILED DESCRIPTION

In accordance with embodiments of the present invention, a snapshot is a block level point-in-time representation of data on a storage volume. The data is essentially frozen in time at the instant that the snapshot is taken. Although data on the storage volume may change as a result of write operations, the data within the snapshot will remain constant and frozen in time at the instant that the snapshot was taken. In order to preserve snapshot data, a backing store, also known as a snap pool, is used to store data that is not otherwise represented in the storage volume and snapshot metadata. All data and metadata associated with the snapshot is stored in the backing store. In accordance with embodiments of the present invention, data is stored within the snapshot in "chunks." A chunk is equivalent to a number of Logical Block Addresses (LBAs). Alternatively or in addition, data can be stored within subchunks. A subchunk is a fixed size subset of a chunk. Pointers, table entries, or other data structures can be used to identify the location of a chunk in the backing store.

Figure 1:
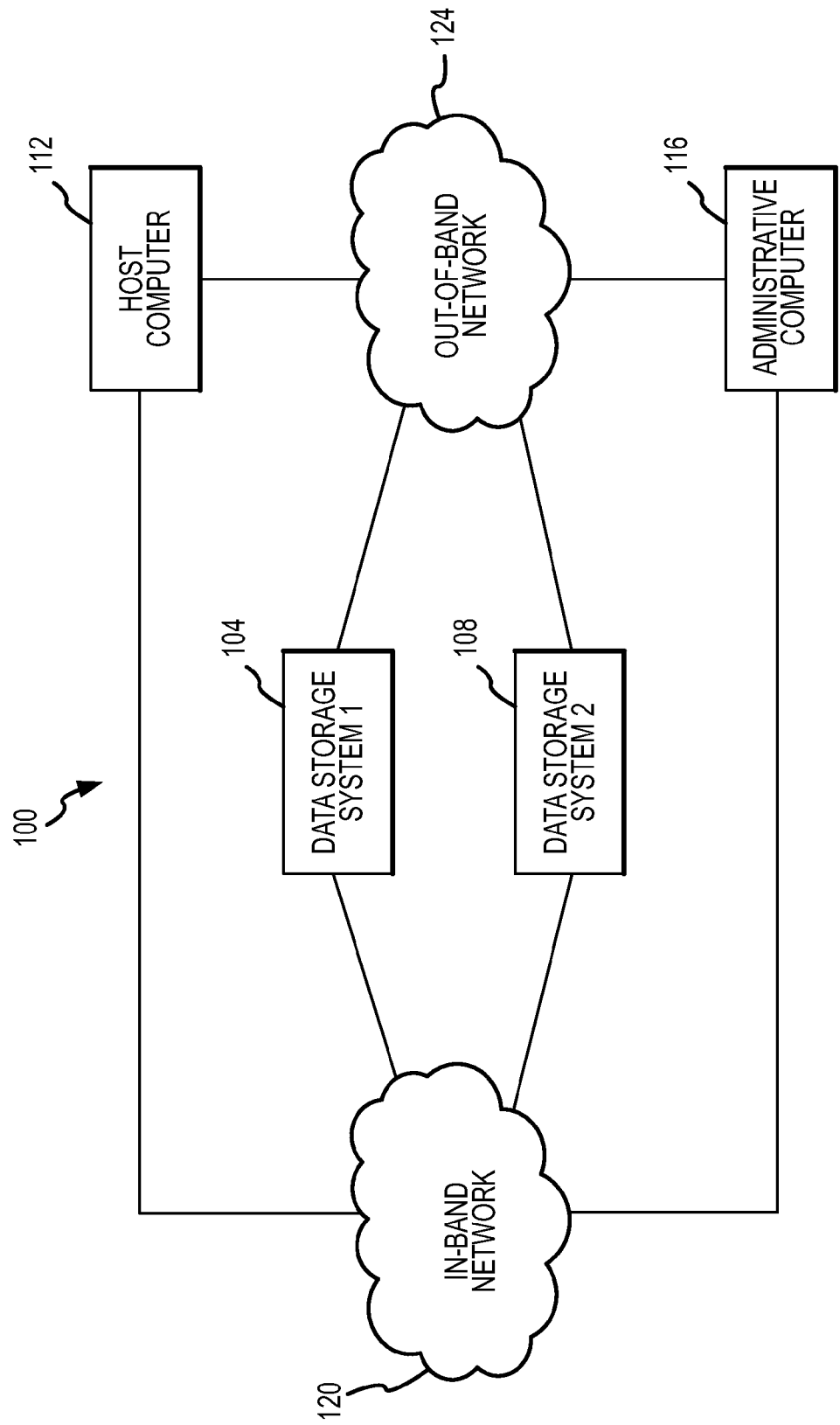
FIG. 1 is a functional block diagram depicting components of an electronic data system incorporating one or more data storage systems in accordance with embodiments of the present invention.

FIG. 1 is a block diagram depicting an electronic data system 100 in accordance with embodiments of the present invention incorporating a first data storage system 104 and a second data storage system 108. The electronic data system 100 may also include one or more host processors, computers or computer systems 112. In addition, the electronic data system 100 may include or may be interconnected to an administrative computer 116. As will be appreciated by one of skill in the art after consideration of the present disclosure, embodiments of the present invention have application in association with single or multiple hosts 112 in storage area network (SAN) or direct connect environments.

The data storage systems 104, 108 are typically interconnected to one another through an in-band network 120. The in-band network 120 may also interconnect the data storage systems 104, 108 to a host computer 112 and/or an administrative computer 116. The electronic data system 100 may also include an out-of-band network 124 interconnecting some or all of the electronic data system 100 nodes 104, 108, 112 and/or 116. For example, one or more host computers 112 are connected to each data storage system 104, 108. For instance, a first data storage system 104 is connected to a second data storage system 108 across some distance by a Fibre Channel or a TCP/IP network 120, and each of these data storage systems 104, 108 is connected to a host computer 112 through an in-band 120 and/or an out-of-band 124 network.

The in-band or storage area network 120 generally functions to transport data between data storage systems 104 and/or 108 and host devices 112, and can be any data pipe capable of supporting multiple initiators and targets. Accordingly, examples of in-band networks 120 include Fibre Channel (FC), iSCSI, parallel SCSI, Ethernet, ESCON, or FICON connections or networks, which may typically be characterized by an ability to transfer relatively large amounts of data at medium to high bandwidths. The out-of-band network 124 generally functions to support the transfer of communications and/or commands between various network nodes, such as data storage resource systems 104, 108, host computer 112, and/or administrative computers 116, although such data may also be transferred over the in-band communication network 120. Examples of an out-of-band communication network 124 include a local area network (LAN) or other transmission control protocol/Internet protocol (TCP/IP) network. In general, the out-of-band communication network 124 is characterized by an ability to interconnect disparate nodes or other devices through uniform user interfaces, such as a web browser. Furthermore, the out-of-band communication network 124 may provide the potential for globally or other widely distributed management of data storage systems 104, 108 via TCP/IP.

Every electronic data system node or computer 104, 108, 112 and 116, need not be interconnected to every other node or device through both the in-band network 120 and the out-of-band network 124. For example, no host computer 112 needs to be interconnected to any other host computer 112, data storage system 104, 108, or administrative computer 116 through the out-of-band communication network 124, although interconnections between a host computer 112 and other devices 104, 108, 116 through the out-of-band communication network 124 are not prohibited. As another example, an administrative computer 116 may be interconnected to at least one storage system 104 or 108 through the out-of-band communication network 124. An administrative computer 116 may also be interconnected to the in-band network 120 directly, although such an interconnection is not required. For example, instead of a direct connection, an administrator computer 116 may communicate with a controller of a data storage system 104, 108 using the in-band network 120.

In general, a host computer 112 exchanges data with one or more of the data storage systems 104, 108 in connection with the performance of the execution of application programming, whether that application programming concerns data management or otherwise. Furthermore, an electronic data system 100 may include multiple host computers 112. An administrative computer 116 may provide a user interface for controlling aspects of the operation of the storage systems 104, 108. The administrative computer 116 may be interconnected to the storage system 104, 108 directly, and/or through a bus or network 120 and/or 124. In accordance with still other embodiments of the present invention, an administrative computer 116 may be integrated with a host computer 112. In addition, multiple administrative computers 116 may be provided as part of the electronic data system 100. Furthermore, although two data storage systems 104, 108 are shown in FIG. 1, an electronic data system 100 may include more than two data storage systems or may include a single data storage system.

Figure 2:
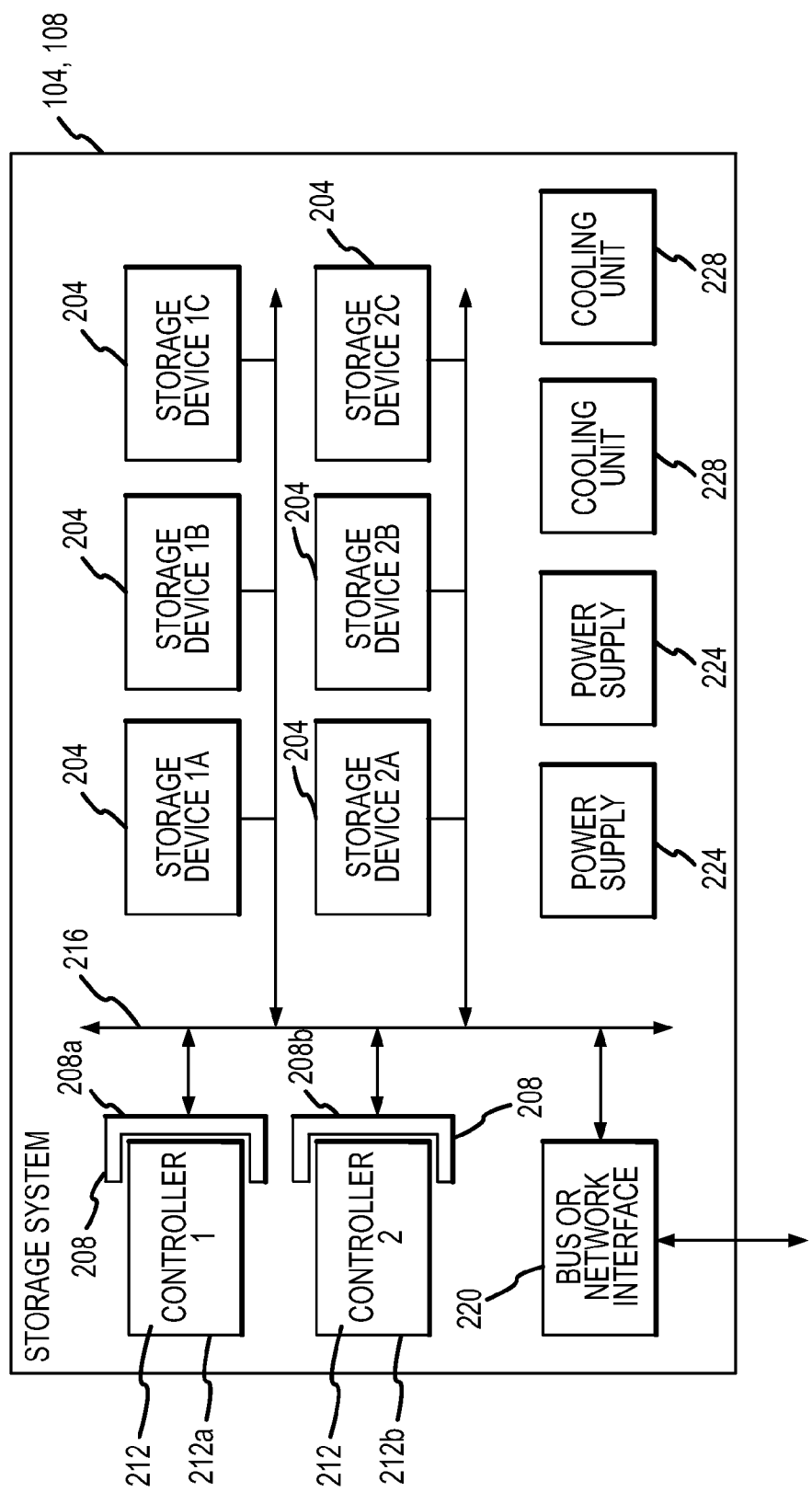
FIG. 2 is a block diagram depicting components of a data storage system in accordance with embodiments of the present invention.

FIG. 2 illustrates components that may be included in a data storage system 104, 108 in accordance with embodiments of the present invention. In general, the data storage system 104, 108 includes a number of storage devices 204. Examples of storage devices 204 include hard disk drives, such as serial advanced technology attachment (SATA), small computer system interface (SCSI), serial attached SCSI (SAS), Fibre Channel (FC), or parallel advanced technology attached (PATA) hard disk drives. Other examples of storage devices 204 include magnetic tape storage devices, optical storage devices or solid state disk devices. Furthermore, although a number of storage devices 204 are illustrated, it should be appreciated that embodiments of the present invention are not limited to any particular number of storage devices 204, and that a lesser or greater number of storage devices 204 may be provided as part of a data storage system 104. As can be appreciated by one of skill in the art, one or more arrays and/or array partitions, hereinafter referred to as logical unit numbers (LUNs) comprising a storage volume, may be established on the data storage devices 204. As can be further appreciated by one of skill in the art, a LUN may be implemented in accordance with any one of the various array levels or other arrangements for storing data on one or more storage devices 104. As can also be appreciated by one of skill in the art, the storage devices 204 may contain data comprising a master storage volume, which may correspond to a LUN, in addition to one or more snapshots of the master storage volume taken at different times. As can further be appreciated by one of skill in the art, snapshots may comprise metadata and data stored in a backing store on the storage devices 204. As can also be appreciated by one of skill in the art, the storage devices 204 contain data comprising a master storage volume, which may correspond to a LUN, and one or more snapshots of the storage volume taken at different times. In one embodiment, the snapshots may be mapped to the LUNs and stored on a backing store. However, the backing store, which also occupies an array and/or array partition, does not have a LUN number assigned to it, thus making the backing store invisible to a host computer 112 and/or administrative computer 116.

A data storage system 104, 108, in accordance with embodiments of the present invention, may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104, 108. Furthermore, a data storage system 104, 108 in accordance with embodiments of the present invention includes at least one controller 212a. For example, while the data storage system 104, 108 is operated in a single controller, non-failover mode, the data storage system 104, 108 may include exactly one controller 212. A data storage system 104, 108 in accordance with other embodiments of the present invention may be operated in a dual redundant active-active controller mode by providing a second controller 212b. When a second controller 212b is used in addition to a first controller 212a, the second controller slot 208b receives the second controller. As can be appreciated by one of skill in the art, the provision of two controllers, 212a and 212b, permits data to be mirrored between the controllers 212a-212b, providing redundant active-active controller operation.

One or more busses or channels 216 are generally provided to interconnect a controller or controllers 212 through the associated controller slot or slots 208 to the storage devices 204. Furthermore, while illustrated as a single shared bus or channel 216, it can be appreciated that a number of dedicated and/or shared buses or channels may be provided. Additional components that may be included in a data storage system 104 include one or more power supplies 224 and one or more cooling units 228. In addition, a bus or network interface 220 may be provided to interconnect the data storage system 104, 108 to the bus or network 112, and/or to a host computer 108 or administrative computer 116.

Although illustrated as a complete RAID system in FIG. 2, it should be appreciated that the data storage system 104, 108 can comprise one or more storage volumes implemented in various other ways. For example, the data storage system 104, 108 may comprise a hard disk drive or other storage device 204 connected or associated with a server or a general-purpose computer. As further examples, the storage system 104 may comprise a Just a Bunch of Disks (JBOD) system or a Switched Bunch of Disks (SBOD) system.

Figure 3:
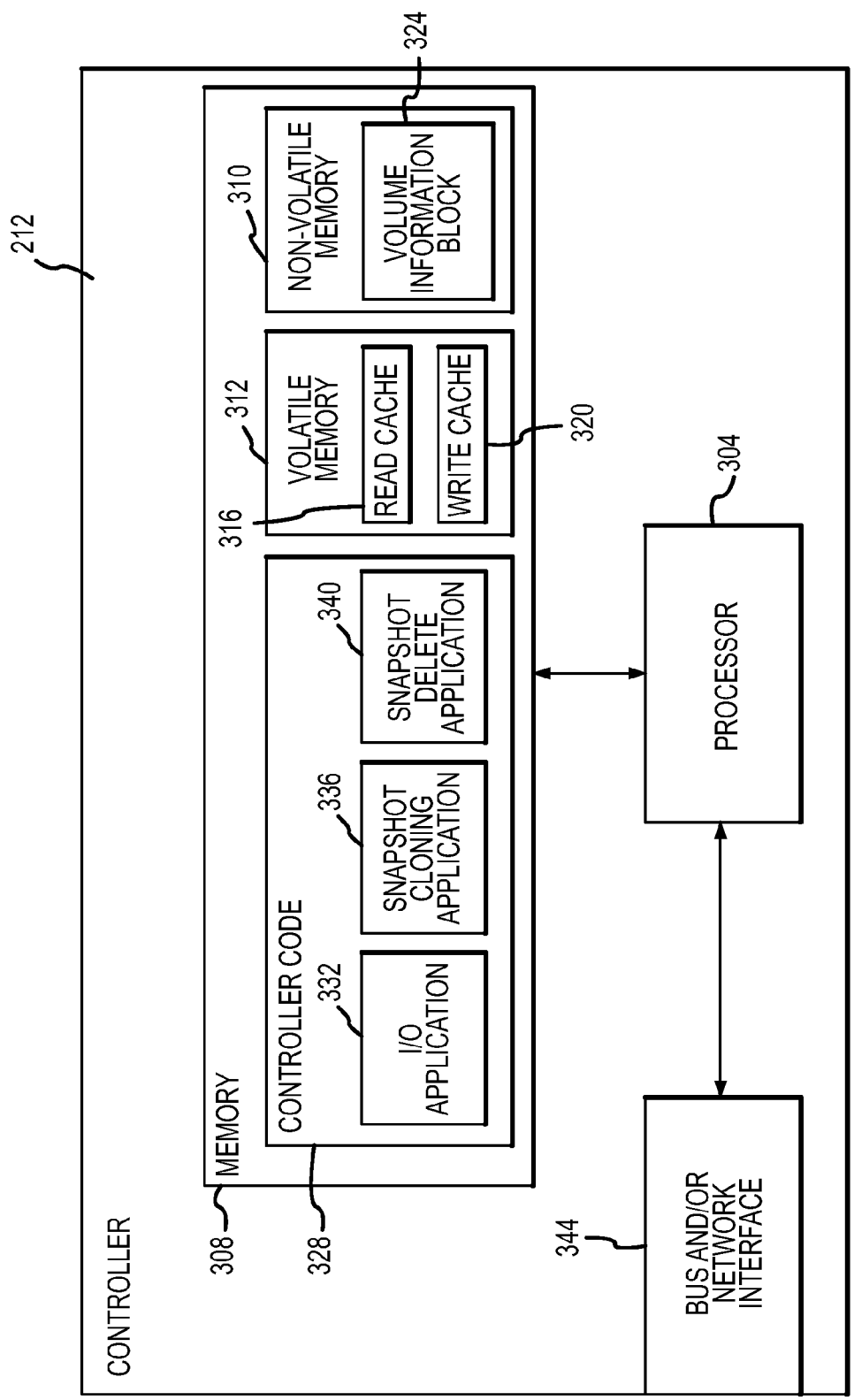
FIG. 3 is a block diagram depicting components of a storage controller in accordance with embodiments of the present invention.

FIG. 3 illustrates aspects of a storage controller 212 in accordance with embodiments of the present invention. In general, a storage controller 212 includes a processor subsystem 304 capable of executing instructions for performing, implementing and or controlling various controller 212 functions. Such instructions may include instructions for implementing aspects of a snapshot cloning method and apparatus. Furthermore, such instructions may be stored as software and/or firmware. As can be appreciated by one of skill in the art, operations concerning the generation of parity data or other operations may be performed using one or more hard-wired and/or programmable logic circuits provided as part of the processor subsystem 304. Accordingly, the processor subsystem 304 may be implemented as a number of discrete components, such as one or more programmable processors in combination with one or more logic circuits. Processor subsystem 304 may also include or be implemented as one or more integrated devices or processors. For example a processor subsystem may comprise a complex programmable logic device (CPLD).

A controller 212 also generally includes memory 308. The memory 308 is not specifically limited to memory of any particular type. For example, the memory 308 may comprise a solid-state memory device, or a number of solid-state memory devices. In addition, the memory 308 may include separate non-volatile memory 310 and volatile memory 312 portions. As can be appreciated by one of skill in the art, the memory 308 may include a read cache 316 and a write cache 320 that are provided as part of the volatile memory 312 portion of the memory 308, although other arrangements are possible. By providing caches 316, 320, a storage controller 212 can improve the speed of input/output (IO) operations between a host 112 and the data storage devices 204 comprising an array or array partition. Examples of volatile memory 312 include DRAM and SDRAM.

The non-volatile memory 310 may be used to store data that was written to the write cache of memory 308 in the event of a power outage affecting the data storage system 104. The non-volatile memory portion 310 of the storage controller memory 308 may include any type of data memory device that is capable of retaining data without requiring power from an external source. Examples of non-volatile memory 310 include, but are not limited to, compact flash or other standardized non-volatile memory devices.

A volume information block 324 may be stored in the non-volatile memory 310, although in accordance with at least some embodiments of the present invention, the volume information block 324 resides in volatile memory 312. The volume information block 324 comprises data that may be used to represent attribute and state information for master volumes, backing stores, and/or snapshots. Each master volume, backing store, and snapshot is typically associated with a different volume information block 324. The volume information block 324 is generally employed by the processor 304 to determine whether certain data is located on master volumes, backing stores, and/or snapshots and whether such data is safe to access based on the state of each. For example, the state of a master volume or backing store may be such that if data access were attempted, data corruption may occur. Accordingly, the volume information block 324 may be referenced prior to data access during an I/O operation.

The memory 308 also includes portions of the memory 308 comprising a region that provides storage for controller code 328. The controller code 328 may comprise a number of components, including an I/O application 332 comprising instructions for accessing and manipulating data. The I/O application 332 may provide the controller 212 with the ability to perform read and/or write operations of data on a storage volume and/or on a snapshot. The I/O application 332 may reference the volume information block 324 prior to executing such operations. The I/O application 332 may also employ the read and write caches 316 and 320 respectively when performing such operations.

A snapshot cloning application 336 is an example of another application that may be included in the controller code 328. The snapshot cloning application 336 may be adapted to create and manage clones of existing snapshots. In accordance with at least one embodiment of the present invention, the snapshot cloning application 336 is characterized by the ability to create snapshot clones that represent the same point-in-time as their base snapshot, even if the base snapshot allows both read and write operations. Furthermore, the snapshot cloning application 336 may be adapted to create clone snapshots that support controller 212 initiated and host 112 initiated read and write operations.

The controller code 328 may also comprise a snapshot delete process or application 340 comprising instructions for deleting a snapshot from a backing store as described herein. The snapshot delete application 340 may be operable to delete snapshots having clones as well as clone snapshots themselves. Further details of the snapshot delete application 340 are described more fully in U.S. patent application Ser. No. 11/560,174, filed on Nov. 15, 2006, the entire contents of which are hereby incorporated herein by this reference.

A storage controller 212 may additionally include other components. For example, a bus and/or network interface 344 may be provided for operably interconnecting the storage controller 212 to the remainder of the data storage system 104, for example through a controller slot 208 and a bus or channel 216. Furthermore, the interface 344 may be configured to facilitate removal or replacement of the storage controller 212 in a controller slot 208 as a field replaceable unit (FRU). In addition, integral signal and power channels may be provided for interconnecting the various components of the storage controller 212 to one another.

Figure 4:
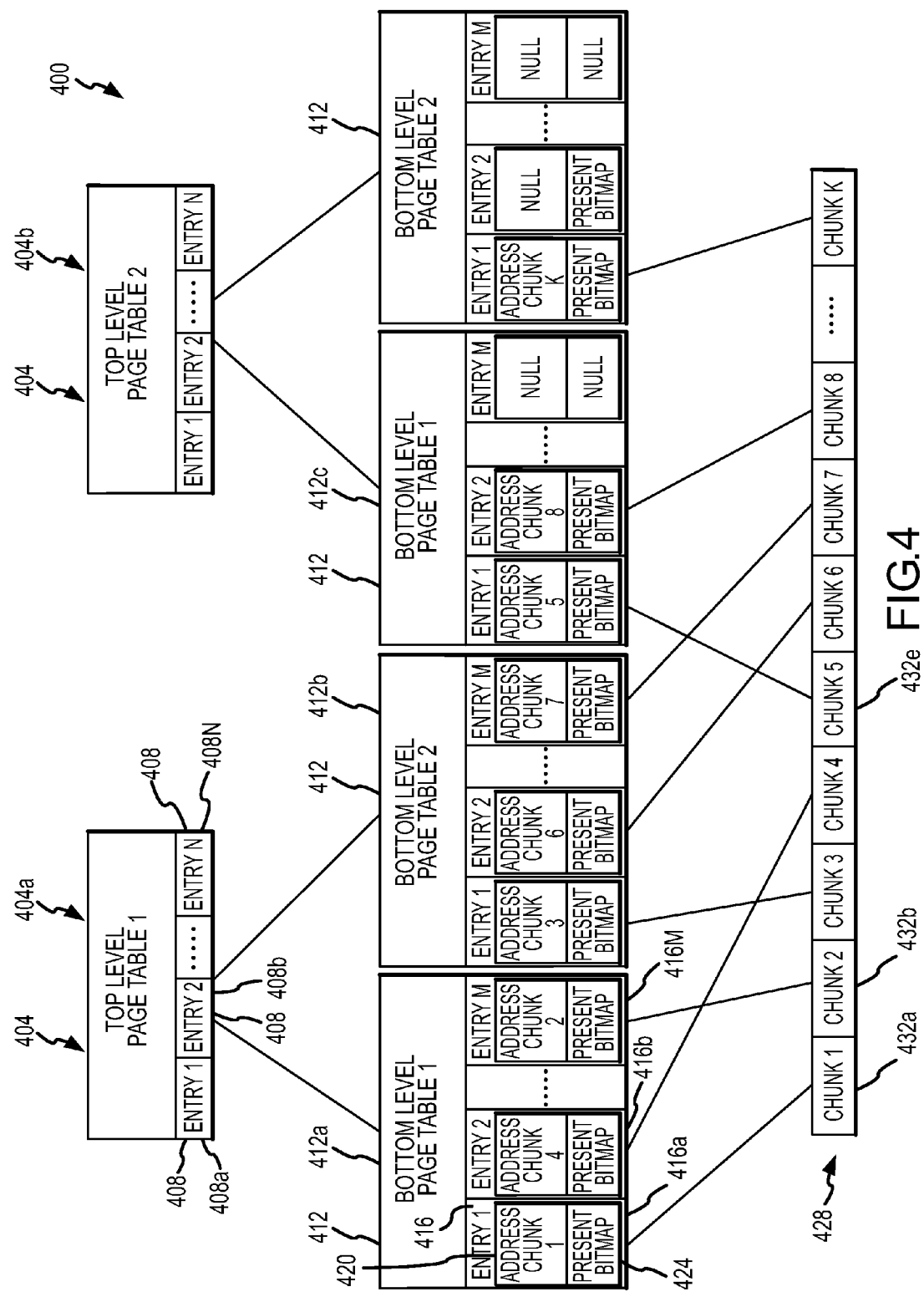
FIG. 4 is a block diagram depicting an exemplary data structure employed for storing snapshots in accordance with embodiments of the present invention.

FIG. 4 depicts a data structure 400 employed in association with the storage of snapshot data on a backing store. One or more Top Level Page Tables (TLPTs) 404 are created when a snapshot is taken of a master volume. As noted above, a snapshot comprises data that represents a point-in-time image of the master volume when the snapshot is taken. In accordance with one embodiment of the present invention, each snapshot comprises at least two TLPTs 404. A first TLPT 404a may be used to maintain preserved data (e.g., data that has been written to a backing store by a controller 212, usually via a COW operation, in order to preserve it for the snapshot) whereas a second TLPT 404b may be used to maintain write data (e.g., data that is written directly to the snapshot by a host 112). Although two TLPTs 404 are depicted, one skilled in the art will appreciate that more or less TLPTs 404 may reside on a backing store. For instance, multiple snapshots may reside on the backing store each having a number of TLPTs 404. Additionally, each snapshot may have a different TLPT 404 for maintaining preserved data and write data. Snapshots may also be allocated a temporary TLPT 404 for use during temporary operations, such as during a rollback procedure. Once the temporary operation is completed, the temporary TLPT 404 may be revoked from the snapshot. As can be appreciated, the number of TLPTs 404 stored on a backing store depends upon the number of snapshots taken and the memory capacity of the backing store.

In accordance with one embodiment of the present invention, preserved data is only copied to the newest snapshot during a COW operation that is initiated when there is a write of data to the master volume. As a result of a snapshot only being updated during a COW, it is possible that the older snapshot does not contain a pointer or table entry for all data from the master volume at the time the older snapshot was taken. Rather, data stored on the master volume at the time the older snapshot was taken may be preserved in association with the first snapshot if that data was not written until after the newer snapshot was taken. Alternatively, if the data has not changed on the master volume since a snapshot was taken, the data for the snapshot is maintained on the master volume.

A TLPT 404 generally comprises a list of pointers, where each pointer points to a different Bottom Level Page Table (BLPT) 412. The pointers to each BLPT 412 are typically stored in the TLPT 404 as a TLPT Entries (TLPTEs) 408. Each TLPTE 408 does not necessarily need to point to a BLPT, meaning that a TLPTE 408 can have a null value until additional snapshot data needs to stored in association with the TLPT 404. Accordingly, when a snapshot of a master volume is taken, a TLPT 404 can be created with TLPTEs 408a-N, where N is typically greater than or equal to one. In one embodiment, upon creation of a snapshot, a TLPT 404 is created with a number of TLPTEs 408a-N. These TLPTEs 408a-N are initially empty (i.e., have a null value). Each TLPTE 408 corresponds to a BLPT 412 and therefore a range of BLPT Entries (BLPTEs) 416. A structure of BLPTEs 416 are also created with each BLPTE 416 being reserved to point at a particular chunk 432 corresponding to a Logical Block Address (LBA) on the master volume. However, since data from the master volume is only written to the backing store when the master volume is being rewritten the BLPTEs 416 are initially null as well. As the operation of the master volume continues some of the TLPTEs 408a-N may eventually have pointers to BLPTs 412, whereas other TLPTEs 408a-N may be empty. A pointer included in a TLPTE 408 is generally stored as a memory address of the BLPT and generally has a size of about 4 bytes but can have a size of up to about 8 bytes. Although the TLPTEs 408a-N are shown being filled in order (i.e., the first TLPTE 408a is filled before the second TLPTE 408b which is filled before the Nth TLPTE 408N), the order in which TLPTEs 408a-N are populated may be arbitrary.

The BLPTs 412a-N contain pointers, stored as BLPTEs 416, that point to actual preserved data or write data for the snapshot associated with the corresponding TLPT 404. In one embodiment, each BLPTE 416a-M represents a range or "chunk" that comprises at least a subset of the snapshot data 432a-K on the backing store 428. An address chunk identifier 420 identifies the location of the corresponding chunk of data 432 on the backing store 428. A chunk 432 stores data that provides a moment in time picture of an LBA on the master volume. Therefore, two different chunks 432 can store data related to the same LBA but taken at different times.

Each chunk 432a-K may be further divided into subchunks via the use of a present bitmap 424. Although described as a bitmap, one skilled in the art will appreciate that the present bitmap 424 may be replaced with any other type of data table or map used to organize and manage chunk and subchunk data. The present bitmap 424 information stored in the BLPTE 416 can be used to indicate where that subchunk is located within the chunk 432, either on the backing store 428 or on the master volume and if the subchunk contains user data. In accordance with one embodiment, each chunk 432 corresponds to about 2 MB of memory and each subchunk corresponds to about 64 KB of memory. As can be appreciated by one skilled in the art, the chunk address identifiers 420 for each BLPTE 416 in a BLPT 412 does not need to be assigned to a chunk 432 consecutively as shown in FIG. 4. For example, the Mth BLPTE 416 of the first BLPT 404a could be allocated before first BLPTE 416 of the first BLPT 404a. However, in other embodiments, the BLPTEs 416 could be assigned chunks 432 consecutively to make assignment of chunks more orderly.

The controller 212 uses a hierarchical system of pointers to store snapshot data so that read and write commands for the snapshot data can be quickly and efficiently executed. When a snapshot read command is received by the controller 212, the controller 212 can quickly locate a portion of snapshot data by first identifying the TLPT 404 corresponding to the requested snapshot then drill down to the requested data using the pointers in the TLPT 404 and BLPT 412. If the controller 212 determines that the data is not on the requested snapshot (e.g., 404b), the controller 212 will search for a newer snapshot (e.g., 404a). If the data is not on the newer snapshot (e.g., 404a), then the data will be on the master volume. However, in accordance with one embodiment of the present invention, when a newer snapshot is deleted, the controller 212 will ensure that data which should be stored on an older snapshot but was stored on the snapshot being deleted is preserved in the older snapshot before the newer snapshot is deleted so that such data is not lost.

Although the data structure 400 employed in accordance with preserving snapshot data is depicted and described as having two levels of entries (i.e., top levels and bottom levels), it can be appreciated by one of skill in the art that a greater or lesser number of levels may be employed. For instance, several levels of entries may be utilized. Additionally, aspects of the present invention may be employed with different levels of indirect page tables. Furthermore, other types of snapshot data structures may be employed in accordance with embodiments of the present invention such as B-Trees and other similar quick-lookup data structures.

Figure 5:
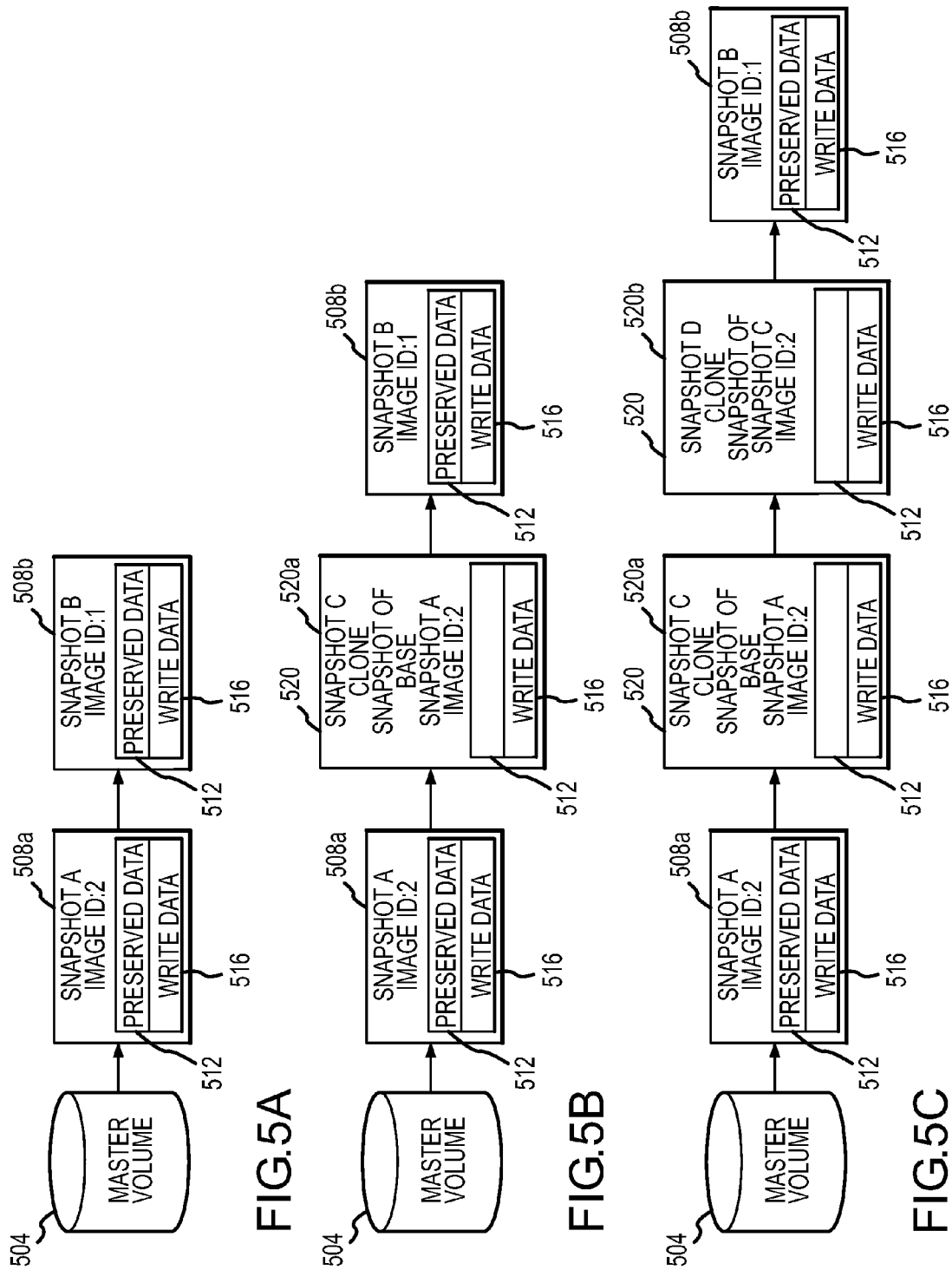
FIG. 5A is a block diagram depicting a series of snapshots of a master volume in accordance with embodiments of the present invention.
FIG. 5B is a block diagram depicting a series of snapshots and a clone snapshot of a master volume in accordance with embodiments of the present invention.
FIG. 5C is a block diagram depicting a series of snapshots and two clone snapshots of a master volume in accordance with embodiments of the present invention.

With reference to FIGS. 5A-C, a series of snapshots and clone snapshots will be described in accordance with at least some embodiments of the present invention. Referring initially to FIG. 5A, a master volume 504 is depicted having two snapshots 508a and 508b associated therewith. The snapshots are ordered based on their relative age where the first snapshot 508a is a newer snapshot of the master volume 504 than the second snapshot 508b. Accordingly, if the I/O application 332 were searching for snapshot data associated with the second snapshot 508b, the I/O application 332 would first search the second snapshot 508b, and if the data is not found there, the I/O application 332 would search the first snapshot 508a. If the data is not on the first snapshot 508a, then the I/O application 332 would find the data on the master volume 504.

As noted above, each snapshot 508 may be created with separate and distinct preserved data 512 and write data 516. The preserved data 512 may correspond to a first TLPT and the write data 516 may correspond to a second TLPT. Accordingly, changes to the snapshot 508 by a COW operation may affect the preserved data 512 while host initiated changes to the snapshot 508 may affect the write data 516.

Changes in the master volume 504 made after creation of the second snapshot 508b but before creation of the first snapshot 508a are written to the preserved data 512 of the second snapshot 508b. The preserved data 512 of the second snapshot 508b is changed by COW operations initiated by the controller 212. However, once the newer first snapshot 508a is created, the preserved data 512 of the second snapshot 508b is not changed. Rather, changes to the master volume 504 are reflected in the preserved data 512 of the first snapshot 508a.

Referring now to FIG. 5B, the snapshot cloning application 336 may create a first clone snapshot 520a of the first snapshot 508a. The first clone snapshot 520a is assigned an "age" that is relatively older than the first snapshot 508a, although the first clone snapshot 520a effectively represents the same point-in-time of the master volume 504 as the first snapshot 508a. Since the first clone snapshot 520a is associated with the first snapshot 508a, it will be considered newer than the second snapshot 508b that was created prior to the first snapshot 508a.

In accordance with embodiments of the present invention, the first clone snapshot 520a is created with separate data structures for the preserved data 512 and write data 516 much like its base snapshot (i.e., first snapshot 508a). Unlike the base snapshot, however, the preserved data structure 512 for the first clone snapshot 520a is empty or null. Instead of maintaining its own preserved snapshot data 512, the first clone snapshot 520a utilizes the preserved data 512 of its base snapshot. The preserved data 512 for the first clone snapshot 520a may be associated with or share the preserved data 512 of the first snapshot 508a by assigning the first clone snapshot 520a the same image ID as the base snapshot. This way, when the I/O application 332 is searching for preserved data from the first clone snapshot 520a, the I/O application 332 will know to search the base snapshot.

In accordance with further embodiments of the present invention, considering the clone snapshot 520 as an older snapshot than its base snapshot 508 will allow the I/O application 332 to use its normal search algorithm to find the snapshot data for the clone snapshot 520. Since the first clone snapshot 520a does not have any preserved data, when the I/O application 332 searches the first clone snapshot 520a for preserved data 512 it will find none and automatically move on to search the base snapshot 508 where the preserved data 512 is maintained for the clone 520.

The write data 516 of the first clone snapshot 520a may also be created as an empty data structure. In other words, the write data 516 may initially correspond to a TLPT 404 that has no values for its TLPTEs 408. The write data 516 may only be populated in response to a host 112 initiated write command. All other changes to the first clone snapshot 520a may correspond to COW operations initiated by the controller 212, which change the preserved data 512 of the first snapshot 508a rather than altering the first clone snapshot 520a.

Referring now to FIG. 5C, a second clone snapshot 520b may be created in a similar fashion to the first clone snapshot 520a. The second clone snapshot 520b may either be a direct clone of the first snapshot 508a or a clone of the first clone snapshot 520a. Regardless, the second clone snapshot 520b may comprise separate data structures for the preserved data 512 and write data 516. The preserved data structure 512 may be left empty and may therefore share the preserved data of its base snapshot (i.e., the first snapshot 508a). Alternatively, the clone 520 may be created without any data structure for preserved data 512. Either way, a plurality of snapshot clones 520 may be created without creating multiple copies of the same preserved data 512. Furthermore, the clone snapshots 520 may be maintained for a relatively long amount of time since a change to the clone snapshot's 520 write data 516 will not affect the write data 516 or preserved data 512 of the base snapshot 508.

Figure 6:
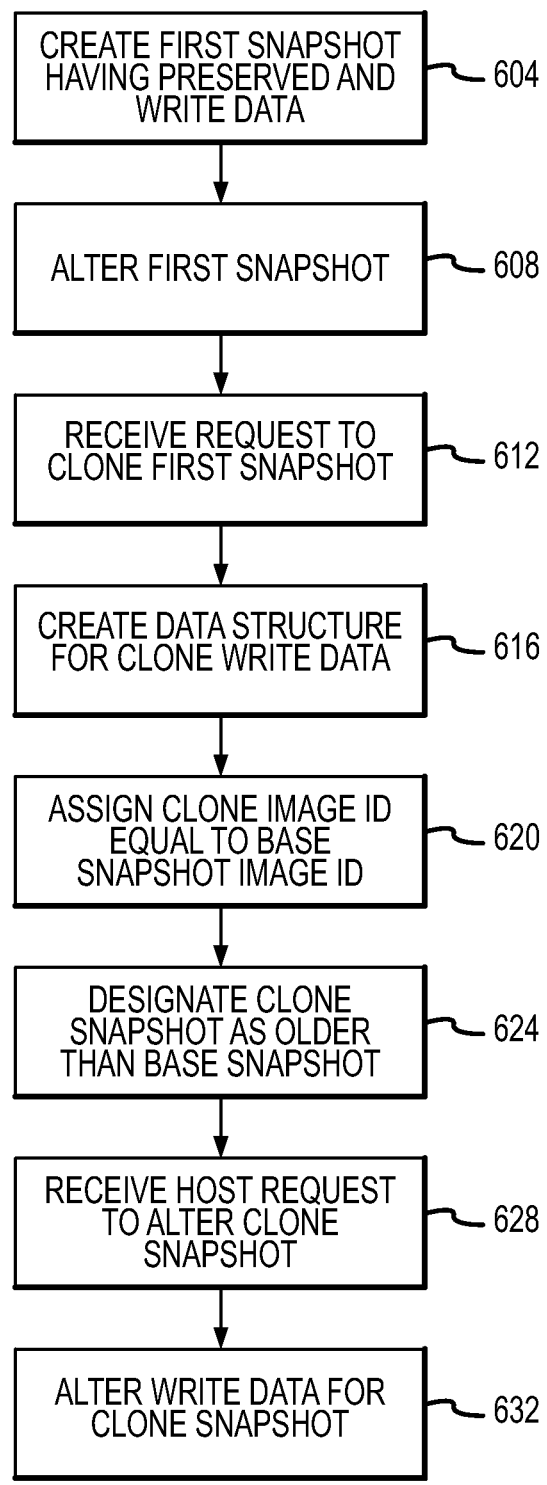
FIG. 6 is a flowchart depicting a method of cloning a snapshot in accordance with embodiments of the present invention.

FIG. 6 is a flow diagram depicting a method of creating a clone snapshot 520 in accordance with at least some embodiments of the present invention. The method begins when a first snapshot 508 is created having a preserved data structure 512 and a write data structure 516 (step 604). The snapshot 508 comprises data that represents a point-in-time image of the master volume 504. As noted above, the preserved data 512 of the snapshot 508 is controller 212 alterable, whereas the write data 516 of the snapshot 508 is host 112 alterable. Initially, the data structures 512, 516 are empty, in that there is no snapshot data stored in association with the data structures. However, as time progresses, the first snapshot data is ultimately altered (step 608). The first snapshot data may be altered either by a controller 212 or a host 112. In accordance with one embodiment of the present invention, as the master volume 504 is altered by host activity, the controller 212 may initiate COW operations that cause snapshot data to populate the preserved data structure 512. Alternatively, a host may directly alter the snapshot data by writing to the write data 516.

At some point after the first snapshot 508 has been created, and likely after it has been altered, the controller 212 receives a request to clone the first snapshot 508 (step 612). The request may be initiated by a host 112 or administrative computer 116. Alternatively, the request may be controller 212 initiated in response to instructions stored on the controller 212 requesting the automatic creation of a clone snapshot 520 at a particular point time.

In response to receiving the request, the snapshot cloning application 336 creates the clone 520 along with a data structure for the clone's write data 516 (step 616). In accordance with one embodiment of the present invention, the snapshot cloning application 336 creates clone snapshots 520 without preserved data structures. In an alternative embodiment, the snapshot cloning application 336 creates a data structure for the clone's 520 preserved data, but that particular data structure will remain empty since the clone 520 will be sharing the preserved data 512 of its base snapshot 508 (e.g., the first snapshot).

As an alternative to creating a preserved data structure for the clone snapshot 520, the snapshot cloning application 336 assigns the clone snapshot 520 an image ID equal to the image ID of the base snapshot (step 620). The image ID may provide the I/O application 332 with an indication of which snapshot should be searched when the I/O application 332 attempts a search of the clone 520 for preserved data. In other words, the I/O application 332 may quickly identify a clone's 520 base snapshot 508 by referencing the image ID and thus may be able to skip directly to the preserved data 512 of the base snapshot rather than searching a number of clones 520. This may prove especially useful if a base snapshot 508 has a large number of clone snapshots 520.

After the snapshot cloning application 336 has assigned the clone snapshot 520 an image ID, the snapshot cloning application 336 continues by designating the clone snapshot 520 as older than its base snapshot 508 (step 624). The relative age designation can help facilitate snapshot data retrieval functions in that the clone snapshot 520 will first be searched for its snapshot data. If the data is not found on the clone snapshot 520, then a snapshot-searching algorithm executed by the I/O application 332 will cause the newer (i.e., the base snapshot 508 having the preserved data 512) to be searched next.

Thereafter, the operation of the data storage system 108 may continue where changes to the master volume 504 are reflected in the preserved data 512 of the newest snapshot. However, a host 112 or the like can directly alter the clone snapshots 520 and other snapshots 508 in the write data 516. Accordingly, the method continues upon receiving a host 112 request to alter a clone snapshot 520 (step 628). In response to receiving this direct request, the write data 516 of the identified snapshot is altered according to the host's 112 request (step 632). Advantageously, altering the write data 516 for a clone snapshot 520 will not affect its base snapshot 508 and vice versa.

Figure 7:
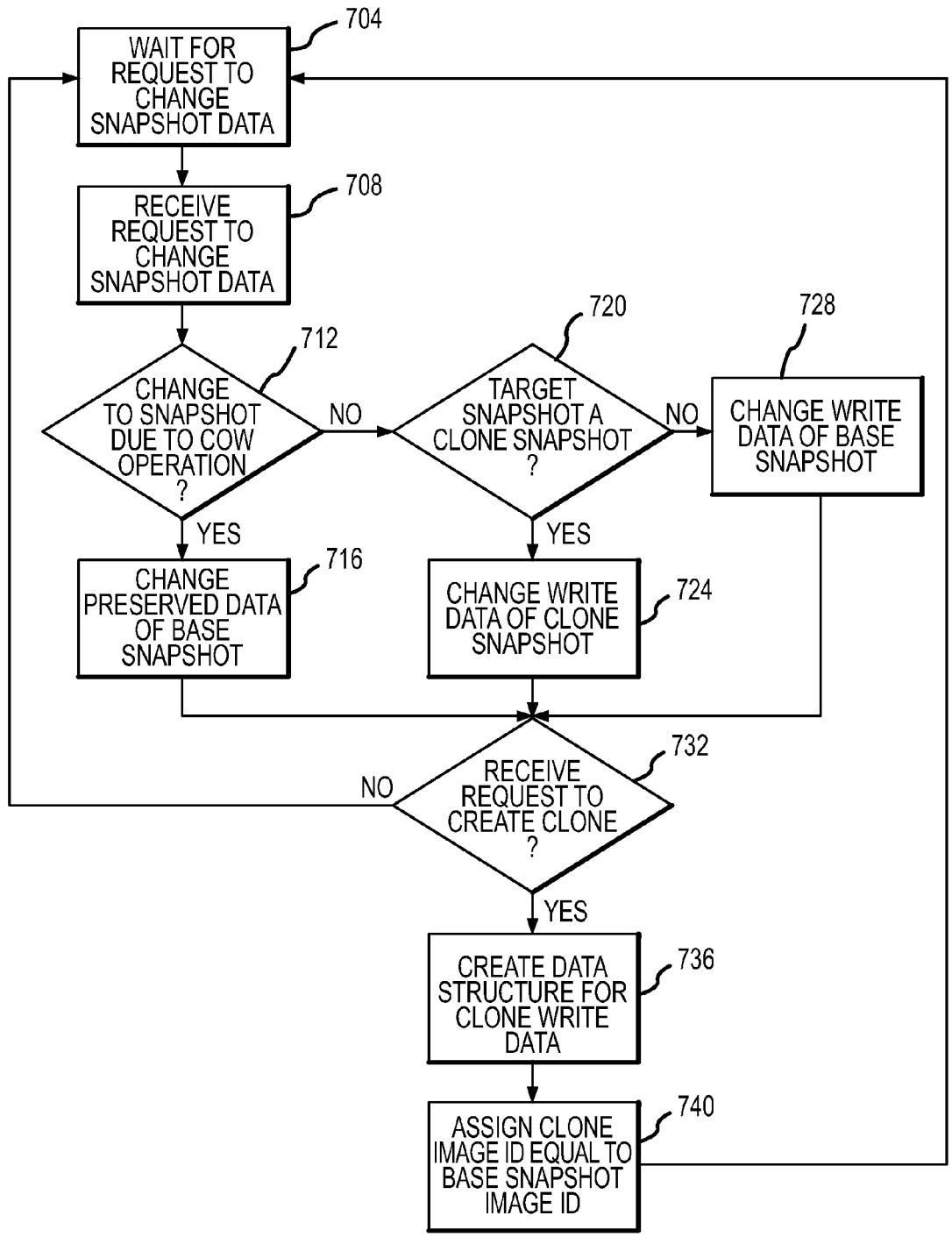
FIG. 7 is a flowchart depicting a method of manipulating and cloning snapshots in accordance with embodiments of the present invention.

FIG. 7 is a flow diagram depicting a method of manipulating and cloning snapshots in accordance with at least some embodiments of the present invention. Initially, the controller 212 is in a ready state, waiting to receive a request to change snapshot data (step 704). The method continues when a request to change snapshot data is received (step 708). As noted above, the request may be host 112 initiated either in response to the host 112 requesting to alter the master volume 504 or the snapshot data directly.

Upon receiving the request, the controller 212 determines if the change in snapshot data is due to a COW operation (step 712). In other words, the controller 212 determines if the master volume 504 has changed such that original data on the master volume 504 needs to be transferred to snapshot data prior to changing the master volume 504. In the event that the change in snapshot data is required as a part of a COW operation, the controller 212 continues by changing the preserved data 512 of the newest base snapshot 508 associated with the master volume 504 (step 716).

In the event that the change to snapshot data is not due to a COW operation, and is instead a direct request by a host 112 to change the snapshot data, then the controller 212 determines if the targeted snapshot is a clone snapshot 520 (step 720). This determination may be made affirmatively if the snapshot does not have any preserved data 512 associated therewith. If the targeted snapshot is a clone snapshot 520, then the controller 212 continues by altering the write data 516 of the clone snapshot 520 (step 724). On the other hand, if the targeted snapshot does not correspond to a clone snapshot 520 (i.e., it is a base snapshot), then the controller 212 changes the write data 516 of the snapshot 508, which may be considered a base snapshot if it has a corresponding clone 520 (step 728).

Once the appropriate snapshot data has been changed, the method continues by determining if a new clone snapshot 520 is requested (step 732). If a new clone snapshot 520 has not been requested, then the method returns back to step 704 where the controller 212 awaits its next commands. However, if a request for a new clone snapshot 520 has been received, then the controller 212 utilizes the snapshot cloning application 336 to create a clone snapshot 520 along with its associated write data structure 516 (step 736). Thereafter, the clone snapshot 520 is assigned an image ID equal to the image ID of its base snapshot 508 (step 740). Assigning the clone 520 and base snapshot 508 the same image ID provides a reference between the clone snapshot 520 and the base snapshot 508 such that the clone snapshot 520 can share the preserved data 512 of its base snapshot 508. Once the clone snapshot 520 has been successfully created, the method returns back to step 704.

Figure 8:
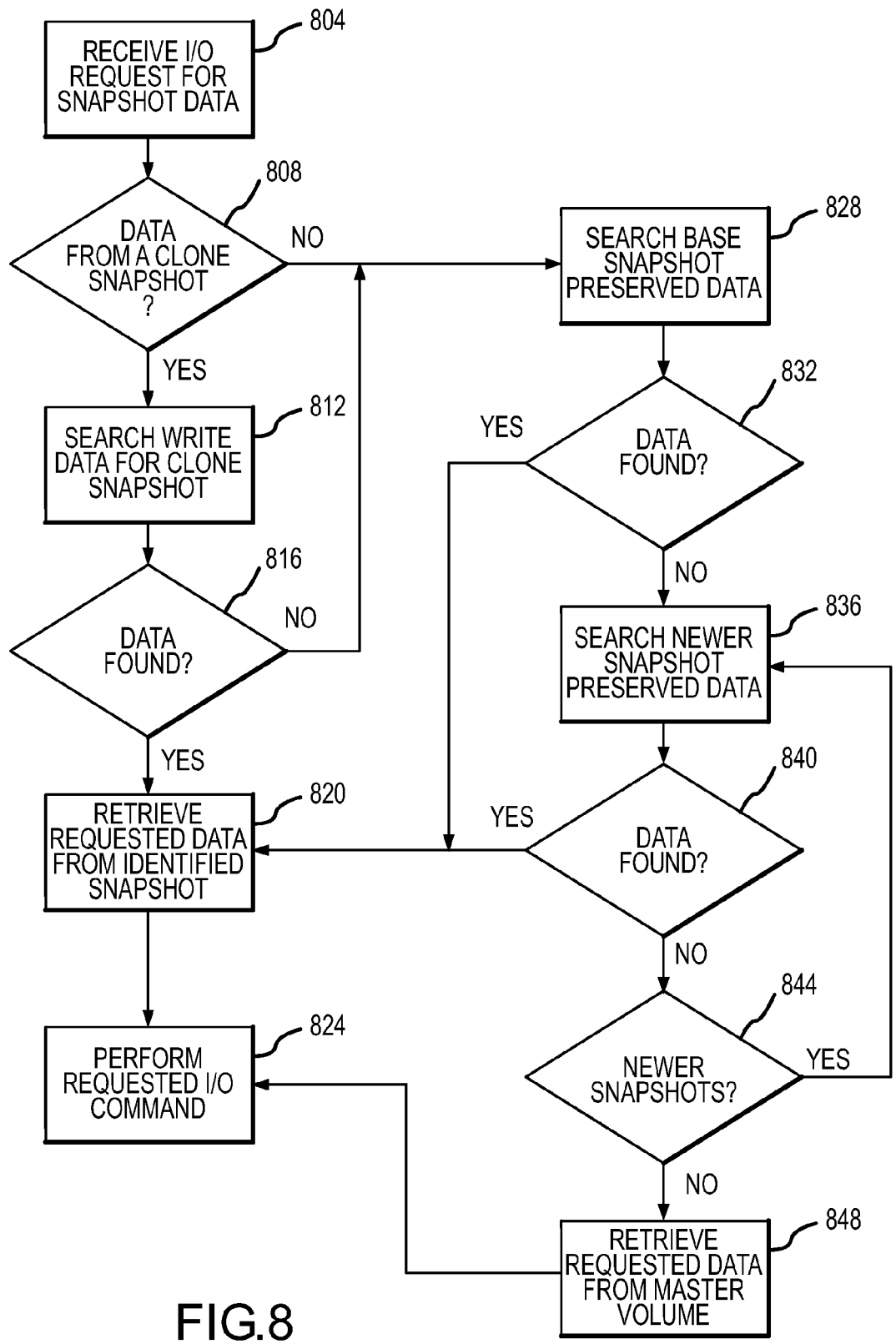
FIG. 8 is a flowchart depicting a method of searching for snapshot data in accordance with embodiments of the present invention.

FIG. 8 is a flow diagram depicting a method of searching for snapshot data in accordance with at least some embodiments of the present invention. The method is initiated when an I/O request for snapshot data is received at the controller 212 (step 804). The I/O request may correspond to a read and/or write operation involving at least some snapshot data. The amount of data required to complete the I/O request may vary from as small as a subchunk to a number of chunks or any other LBA range.

Upon receiving the request, the controller 212 employs the I/O application 332 to determine if the data is associated with a clone snapshot 520 (step 808). In other words, the I/O application 332 determines if the data was requested from a clone snapshot 520. If the data is from a clone snapshot 520, then the I/O application 332 searches the write data 516 of the identified clone snapshot 520 (step 812). The I/O application 332 may search each memory location associated with the write data 516 by scanning the TLPT 404 and possibly the BLPTs 412 associated with the write data 516. The I/O application 332 will search all of the write data 516 to determine if the data is found in the write data structure 516 (step 816). If the data is found in the write data 516, then the I/O application 332 continues by retrieving the requested data from the backing store 428 and pulls it into the read cache 316 (step 828). Of course, the I/O application 332 may reference the volume information block 324 to determine if the requested data is currently in use by another task or application. If the data is marked as currently in use, the I/O application 332 may wait to retrieve the data so that data corruption does not occur.

After the data has been retrieved from the proper storage device 204 and pulled into the read cache 316, the I/O application 332 performs the requested I/O command (step 824). The actions performed in connection with the I/O command may include providing the requested data to the host 112 or administrative computer 116, performing a write of the requested data, or any combination thereof.

Referring back to step 808 and 816, if the requested data is not from a clone 520 or if the requested data was from a clone 520 but not found on the write data 516 of the clone 520, then the I/O application 332 continues by searching the preserved data 512 of base snapshot 508 (step 828). The base snapshot 508 corresponds to the base of the clone snapshot 520 if there was a clone snapshot. If there are multiple clones 520 of the same snapshot, then the I/O application 332 may optimize its search for the requested data by skipping all other clone snapshots 520 and moving directly to the base snapshot 508. Alternatively, if there was no clone snapshot 520, the base snapshot 508 that is searched is the actual snapshot associated with the requested data. The I/O application 332 will search the preserved data 512 until either the requested data is found or the I/O application 332 has determined that the requested data is not stored on the preserved data 512 of the base snapshot (step 832). If the data is found on the preserved data 512 of the base snapshot 508, then the method proceeds to step 820, where the requested data is retrieved from the storage device 204.

However, if the requested data is not found on the preserved data 512, then the I/O application 332 continues searching for the snapshot data on a newer, if such a snapshot exists (step 836). The I/O application 332 generally searches newer snapshots that are base snapshots 508 and skips any clone snapshots 520 that are considered newer, since such snapshots do not typically comprise preserved data 512. The I/O application 332 searches the preserved data 512 of the newer base snapshot 508, if there is any, and determines if the requested data has been stored on that snapshot's 508 preserved data 512 (step 840). If the requested data is found on the newer snapshot, then the I/O application 332 retrieves the subject data from the proper storage device 204 (step 820).

On the other hand, if there was not a newer base snapshot 508, or if the data was not found on the newer snapshot, then the method continues by determining if there are any newer snapshots than the one previously searched (step 844). If there are more newer snapshots of the same master volume 504, then the I/O application 332 continues by searching the next newer base snapshot 508 (step 836). If there are no newer snapshots of the master volume 504, then the I/O application 332 retrieves the requested data from the master volume 504 itself (step 848). The data is on the master volume 504 because it has not been changed since any the requested snapshot was taken and therefore the data has not been transferred to a snapshot via a COW operation. After the data has been recovered from the master volume 504, then method continues with the I/O application 332 performing the requested I/O command (step 824).

Figure 9:
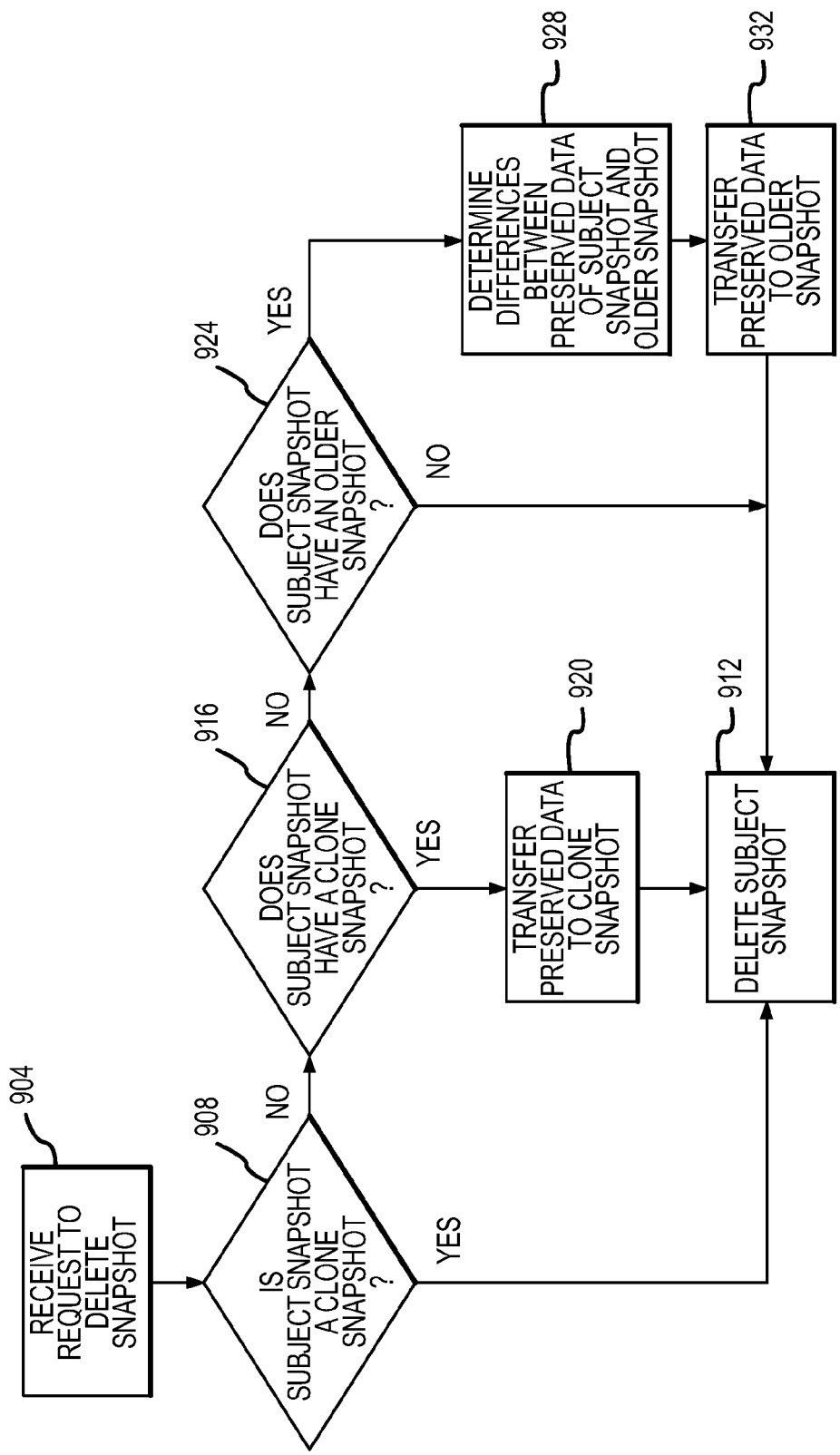
FIG. 9 is a flowchart depicting a method of deleting a snapshot having a clone snapshot in accordance with embodiments of the present invention.

FIG. 9 is a flow diagram depicting a method of deleting a snapshot in accordance with at least some embodiments of the present invention. The method begins when the controller 212 receives a request to delete a snapshot (step 904). The request may be received from a host 112 or administrative computer 116. Alternatively, the controller 212 may automatically generate the request as a part of an automated snapshot management routine.

Upon receiving the request to delete a snapshot, the controller 212 utilizes the snapshot delete application 340 to determine if the subject snapshot is a clone snapshot 520 (step 908). The snapshot delete application 340 may check the data structures of the subject snapshot to make this determination. If the snapshot has a preserved data structure 512 populated with snapshot data, then the snapshot delete application 340 may determine that the snapshot is not a clone. If the snapshot does not have a preserved data structure 512, or has an empty preserved data structure 512, then the snapshot delete application 340 may determine that the snapshot is a clone snapshot.

In the event that the subject snapshot is determined to be a clone snapshot 520, then the snapshot delete application 340 continues by deleting the subject snapshot (step 912). Of course, the snapshot delete application 340 may reference the volume information block 310 prior to deleting the subject snapshot to ensure that its data is not currently in use by another application. The snapshot delete application 340 may delete the subject snapshot by clearing all of the entries of its associated data structures or by deleting the entire data structures. Alternatively, the snapshot delete application 340 may delete the snapshot and its associated data on an entry-by-entry basis, depending upon if another application is currently using some but not all of the snapshot data.

If the subject snapshot is not determined to be a clone snapshot 520, that is the snapshot is a base snapshot 508 or a traditional snapshot without a clone snapshot, then the method continues with the snapshot delete application 340 determining if the subject snapshot has a clone snapshot (step 916). This determination may be made by comparing the subject snapshot's image ID with the image ID of each snapshot that is considered older than the subject snapshot. If an older snapshot is found having the same image ID, then the snapshot delete application 340 may determine that the subject snapshot has a clone snapshot. In the event that the subject snapshot does have a clone snapshot, the snapshot delete application 340 transfers the preserved data 512 of the subject snapshot to the clone snapshot (step 920). The transfer of the preserved data 512 is important since the clone snapshot is relying upon the preserved data 512 of its base snapshot. If the base snapshot is deleted along with its preserved data 512, then the point-in-time picture of the clone snapshot will be lost. If there are multiple clones of the base snapshot, then the preserved data 512 can be transferred to the most recent of those clone snapshots. The most recent clone snapshot may then be considered the base snapshot for all other clone snapshots. This allows all other clones to continue sharing the preserved data 512 of their base snapshot and avoids the need for multiple copies of the same preserved data 512. Once the preserved data 512 has been transferred to the newest clone snapshot, the snapshot delete application 340 continues by deleting the subject snapshot (step 912).

Referring back to step 916, if the subject snapshot does not have a clone snapshot, then the snapshot delete application 340 determines if there are any snapshots of the master volume 504 that are older than the subject snapshot (step 924). This determination may be made by comparing the image ID of each snapshot associated with a particular master volume 504. If there are no snapshots of the same master volume 504 that are older than the subject snapshot, then the snapshot delete application 340 continues by deleting the subject snapshot (step 912).

However, if there are snapshots of the same master volume 504 that are older than the subject snapshot, then those snapshots may require data from the subject snapshot's preserved data field 512. In other words, data associated with the point-in-time of the older snapshot may be stored in association with the subject snapshot's preserved data 512. Accordingly, if there are older snapshots of the same master volume 504, then the snapshot delete application 340 determines the difference between the preserved data 512 of the subject snapshot and the preserved data 512 of the older snapshot (step 512). In other words, the snapshot delete application 340 may perform a chunk-by-chunk comparison of the preserved data 512 of each snapshot to determine if the subject snapshot is storing snapshot data that should be transferred to the older snapshot.

Once the snapshot delete application 340 has identified what, if any, preserved data 512 needs to be transferred to the older snapshot, the snapshot delete application 340 continues by transferring the actual data to the older snapshot (step 932). In accordance with one embodiment of the present invention, the snapshot data is transferred by updating pointers within the preserved data structure 512 of the older snapshot such that they point to the LBA range where the required snapshot data is stored on the backing store 428. This way, the snapshot delete application 340 does not have to create a copy of the actual data but only has to change the pointer of the older snapshot's preserved data structure 512. Once the necessary data has been transferred to the older snapshot, the subject snapshot may be deleted (step 912).

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A device for controlling a storage system, comprising:
a processor; and
a memory, coupled to the processor, comprising:
a cloning application, executed by the processor, adapted to create a first clone snapshot of a base snapshot, wherein the base snapshot is a point-in-time representation of a master volume and comprises a first data structure for maintaining first preserved data from the master volume and a second data structure for maintaining write data to the base snapshot directly from a host computer, wherein the second data structure does not include data from the master volume, wherein the first preserved data is copied from the master volume to the base snapshot during a copy-on-write operation prior to the host computer writing data directly to the master volume, and wherein the first clone snapshot references the first data structure for the first preserved data and comprises a third data structure for maintaining second write data to the first clone snapshot from the host computer.

2. The device of claim 1, wherein the third data structure is initially empty upon creation of the first clone snapshot.

3. The device of claim 1, wherein the second write data is directly written to the third data structure by the host computer, wherein no other portions of the first clone snapshot are affected by the second write data directly written to the third data structure by the host computer, wherein the third data structure does not include data from the master volume or the base snapshot.

4. The device of claim 3, wherein the first data structure comprises a first top level page table (TLPT), wherein the second data structure comprises a second TLPT, and wherein the third data structure comprises a third TLPT.

5. The device of claim 4, wherein the first TLPT comprises entries that point to at least one bottom level page table (BLPT), wherein the at least one BLPT is populated in response to copy on write commands.

6. The device of claim 1, the memory further comprising:
an I/O application adapted to search for snapshot data from the first clone snapshot by first searching the third data structure, then searching the first data structure, then searching second preserved data from a snapshot of the master volume that is newer than the base snapshot, then searching the master volume corresponding to the first clone snapshot.

7. The device of claim 1, wherein the cloning application is further adapted to create a second clone snapshot of the first clone snapshot, wherein the second clone snapshot references the first data structure for the first preserved data and comprises a fourth data structure for maintaining third write data in association with the second clone snapshot, wherein the fourth data structure does not include data from the master volume.

8. A method for cloning a snapshot, comprising:
taking a base snapshot of a master volume by a controller, the controller comprising a processor and memory coupled to the processor, wherein the base snapshot is a point-in-time representation of the master volume and comprises a first data structure for maintaining first preserved data from the master volume and a second data structure for maintaining write data to the base snapshot directly from a host computer, wherein the second data structure does not include data from the master volume, wherein the first preserved data is copied from the master volume to the base snapshot during a copy-on-write operation prior to the host computer writing data directly to the master volume; and
creating a first clone snapshot of the base snapshot, wherein the first clone snapshot references the first data structure for the first preserved data and comprises a third data structure for maintaining second write data to the first clone snapshot from the host computer.

9. The method of claim 8, wherein the third data structure is initially empty upon creation of the first clone snapshot.

10. The method of claim 8, wherein the second write data is directly written to the third data structure by the host computer, wherein no other portions of the first clone snapshot are affected by the second write data directly written to the third data structure by the host computer, wherein the third data structure does not include data from the master volume or the base snapshot.

11. The method of claim 10, wherein the first data structure comprises a first top level page table (TLPT), wherein the second data structure comprises a second TLPT, and wherein the third data structure comprises a third TLPT.

12. The method of claim 11, wherein the first TLPT comprises entries that point to at least one bottom level page table (BLPT), wherein the at least one BLPT is populated in response to copy on write commands.

13. The method of claim 8, the method further comprising:
searching, by an I/O application stored in the memory, for snapshot data from the first clone snapshot comprising:
searching the third data structure;
after searching the third data structure, searching the first data structure; and
after searching the first data structure, searching second preserved data from a snapshot of the master volume that is newer than the base snapshot; and
after searching the second preserved data from the snapshot of the master volume that is newer than the base snapshot, searching the master volume corresponding to the first clone snapshot.

14. The method of claim 8, further comprising:
creating, by a cloning application stored in the memory, a second clone snapshot of the first clone snapshot, wherein the second clone snapshot references the first data structure for the first preserved data and comprises a fourth data structure for maintaining third write data in association with the second clone snapshot, wherein the fourth data structure does not include data from the master volume.

* * * * *